United States Patent
Caldenhoven et al.

(10) Patent No.: US 11,032,745 B2
(45) Date of Patent: Jun. 8, 2021

(54) HANDOVER FOR MOBILE EDGE COMPUTING APPLICATIONS IN MOBILE NETWORKS

(71) Applicant: Vodafone GmbH, Düsseldorf (DE)

(72) Inventors: Jürgen Caldenhoven, Düsseldorf (DE); Yang Lu, Düsseldorf (DE); Alexej Kulakov, Düsseldorf (DE); Peter Alexander Wild, Krefeld (DE)

(*) Notice: Subject to any disclaimer, the term of this patent is extended or adjusted under 35 U.S.C. 154(b) by 0 days.

(21) Appl. No.: 16/424,442

(22) Filed: May 28, 2019

(65) Prior Publication Data
US 2019/0373516 A1    Dec. 5, 2019

(30) Foreign Application Priority Data
May 30, 2018    (EP) .................................... 18175096

(51) Int. Cl.
*H04W 36/22* (2009.01)
*H04W 36/00* (2009.01)
*H04W 76/11* (2018.01)
*H04W 8/08* (2009.01)
*H04W 36/08* (2009.01)
*H04W 80/10* (2009.01)

(52) U.S. Cl.
CPC ......... *H04W 36/0022* (2013.01); *H04W 8/08* (2013.01); *H04W 36/08* (2013.01); *H04W 76/11* (2018.02); *H04W 80/10* (2013.01)

(58) Field of Classification Search
CPC ..................................................... H04L 12/28
USPC ........................................................ 370/329
See application file for complete search history.

(56) References Cited

U.S. PATENT DOCUMENTS

2018/0242204 A1    8/2018  Zhu et al.
2020/0008044 A1*   1/2020  Poornachandran ..... H04L 67/28

FOREIGN PATENT DOCUMENTS

WO    WO 2017/066945 A1    4/2017
WO    WO 2017/125143 A1    7/2017
WO    WO 2017/129742 A1    8/2017

OTHER PUBLICATIONS

WO 2017/066945 A1, Huawei Tech Co Ltd, Apr. 27, 2017, 55 pages (See Translation).*

(Continued)

*Primary Examiner* — Dang T Ton
(74) *Attorney, Agent, or Firm* — Weide & Miller, Ltd.

(57) ABSTRACT

A method, mobile edge system and network system are provided for performing an application handover for mobile edge computing applications in a mobile communication network. The method includes: evaluating signal characteristics of radio signals sent by base stations received by a mobile device, wherein the mobile device is connected to the network via a first base station; exchanging data with a first mobile edge system assigned to the first base station, wherein the first system executes an application assigned to the mobile device; connecting the first system to a second mobile edge system depending on the signal characteristics, wherein the second system is assigned to a second base station; executing the application assigned to the mobile device on the second system; and performing a handover from the first base station to the second base station such that the mobile device is connected with the network via the second base station.

5 Claims, 4 Drawing Sheets

(56) References Cited

OTHER PUBLICATIONS

Fabio Giust: NEC Europe LTD: "MEC Mobility Management; MEC(15)000165_MEC_mobility_management", ETSI Draft; MEC(15)000165_MEC_Mobility_Management, European Telecommunications Standards Institute (ETSI), 650, Route Des Lucioles; F-06921 Sophia-Antipolis; France, vol. ISG-MEC, Jul. 14, 2015 (Jul. 14, 2015), pp. 1-10, XP014250180.
"Mobile Edge Computing (MEC); End to End Mobility Aspects", ETSI Group Report, European Telecommunications Standards Institute (ETSI), 650, Route Des Lucioles, F-06921, Sophia-Antipolis, France, vol. MEC, No. VI.1.1, XP014301471, http://www.etsi.org.deliver/etsi_gr/MEC/001_099/018/01.01.01_60/gr_MEC018v010101p.pdf, Section 4.3, Oct. 18, 2017, pp. 1-52.
Extended European Search Report for EP App. No. 18175096, dated Aug. 7, 2018.

\* cited by examiner

HANDOVER FOR MOBILE EDGE COMPUTING APPLICATIONS IN MOBILE NETWORKS

CROSS-REFERENCE TO RELATED APPLICATIONS

This application claims priority to European Patent Application No. 18175096.9, which was filed on May 30, 2018, the contents each of which is incorporated by reference.

TECHNICAL FIELD OF THE INVENTION

The invention relates method of performing an application handover for mobile edge computing applications in a mobile communication network. The invention further relates to a first mobile edge system for mobile edge computing and network system for mobile edge computing.

BACKGROUND OF THE INVENTION

In currently deployed 3GPP Mobile networks the User Plane (UP) of a Packet Data Network (PDN) connection is terminated in the PGW (Packet Gateway) and Payload (UP Data Packets) need to travel all the way through the PGW towards the Application server which is connect to the PGW. In the future it is expected that in order to reduce UP latency the Application server is deployed physically closer to the base station in order to shorten the way that the payload data packets need to travel. The application will then be running in a so-called Mobile Edge Computer (MEC) which may serve one or more base stations.

SUMMARY OF THE INVENTION

It is an object of the present invention to enable an application handover of an application assigned to a mobile device with short latency in case of a handover of the mobile device.

According to a first aspect a method of performing an application handover for mobile edge computing applications in a mobile communication network is provided. The method comprises the steps of:
  evaluating signal characteristics of radio signals sent by base stations received by a mobile device, wherein the mobile device is connected to the mobile communication network via a first base station,
  exchanging data with a first mobile edge system assigned to the first base station, wherein the first mobile edge system executes an application assigned to the mobile device,
  establishing a connection between the first mobile edge system and a second mobile edge system depending on the evaluation of the signal characteristics of the radio signals, wherein the second mobile edge system is assigned to a second base station,
  activating execution of the application assigned to the mobile device on the second mobile edge system, and
  performing a handover from the first base station to the second base station such that the mobile device is connected with the mobile communication network via the second base station.

The method enables the first mobile edge system the so-called serving mobile edge system to contact and transfer application data or to be more specific the application context of the application of the mobile device running on the first mobile edge system in essentially real-time to the second mobile edge system. The second mobile edge system is thus prepared to take over the application as soon as the handover from the first base station to the second base station is performed. The preparation of the second mobile edge system avoids or at least reduces the risk of increased latency which may be critical for mobile edge application as, for example, providing information for autonomous driving or performing even real time control of an autonomous vehicle via the mobile communication network.

The mobile communication network comprises all available mobile communication technologies or standards which are compatible with mobile edge computing. The first base station may, for example, be operated in accordance with a first communication standard (e.g. LTE) and the second base station may, for example, be operated in accordance with a second communication standard (e.g. 5G) different than the first communication standard.

The term "signal characteristics" comprises all aspects to characterize a radio signal including, for example, signal quality, signal level and the like. The evaluation of the signal characteristics may be performed by the first base station or by the first mobile edge system.

The handover between the first and the second base station comprises all varieties of handovers like, for example, mobile device-initiated handover, base station-initiated handover and the like.

One, two, three or more applications may essentially simultaneously be transferred from the first mobile edge system to the second mobile edge system.

The method may comprise the further step of sending an application handover request to the first mobile edge system from the first base station to the first mobile edge system. The application handover request comprises an application identifier or a mobile device identifier. The application identifier is arranged to identify the application assigned to the mobile device. The mobile device identifier is arranged to identify the mobile device.

The mobile device identifier may, for example, be the IMSI of the mobile device. The application identifier may be any suitable code to identify an application assigned to the mobile device. The mobile device identifier may be sufficient if there is only one first mobile edge system which is assigned to the first base station. The first base station may in this case simply forward the mobile device identifier to the first mobile edge system. The first mobile edge system identifies the assigned application or applications based on the mobile device identifier by means of a corresponding data set stored in the first mobile edge system. The application identifier may be useful if there is more than one first mobile edge system assigned to the first base station. There may, for example, be application-specific first mobile edge systems. The relevant first mobile edge system may in this case be identified by the first base station based on the application identifier. The handover request may optionally comprise the mobile device identifier and the application identifier.

The application handover request may further comprise an identifier of the second mobile edge system. The identifier of the second mobile edge system may be used by the first mobile edge system to identify the second mobile edge system assigned to the second base station. The first mobile edge system identifies the second mobile edge system based on the identifier of the second mobile edge system. Alternatively, an identifier of the second base station may be transferred from the first base station to the first mobile edge system based on the evaluation of the signal characteristics of the radio signals. The first mobile edge system identifies the second mobile edge system based on the data set stored in the first mobile edge system comprising the assignments between relevant base stations and relevant mobile edge systems. The relevance may be determined based on geographic coverage of the base stations arranged in the neighbourhood of the first base station and/or specifications of the respective application running on the first mobile edge system. Furthermore, it may be possible that only the signal characteristics of the radio signals of the surrounding base stations and corresponding identifiers are comprised by the application handover request. The first mobile edge system may in this case determine the second base station by determining, for example, the base station with the best signal characteristics. Transmission of the identifier of the second base station may, for example, have the advantage that no application handover is performed if the second base station is assigned to the first mobile edge system and the second mobile edge system.

The step of activating execution of the application assigned to the mobile device on the second mobile edge system may comprise the further step of:
exchanging application data of the application between the first mobile edge system and the second mobile edge system prior to performing the handover.

Transferring or copying the application data or the application context prior to the handover from the first base station to the second base station may have the advantage that essentially no further data transfer is needed after performing the handover. The application assigned to the mobile device may, for example, already be activated to run on the second mobile edge system prior to the handover. Latency may therefore be further reduced.

The method may in this case comprise the additional steps of:
determining, after performing the handover, whether additional application data has to be transferred in order to execute the application assigned to the mobile device by means of the second mobile edge system, and
exchanging the additional application data of the application between the first mobile edge system and the second mobile edge system.

The data transfer of application data after performing the handover is in this case reduced to the data which could not be transferred prior to the handover. The latter may, for example, be real-time data which changed during first transfer of application data and the handover of the mobile device from the first base station to the second base station.

The method according to any embodiment described above may comprise the additional steps of:
transferring an identifier of the first mobile edge system from the mobile device to the second mobile edge system via the second base station,
exchanging application data of the application between the first mobile edge system and the second mobile edge system after performing the handover upon reception of the identifier of the first mobile edge system.

Reception of the identifier of the first mobile edge system by the second mobile edge system may trigger transfer of application data of the application assigned to the first mobile device. The application data exchange the reception of the identifier of the first mobile edge system may comprise the complete application data or only an update of the application data as described above.

The step of evaluating the signal characteristics of the radio signals received by the mobile device comprises the steps of:

determining a probability of a handover of the mobile device to at least one base station,
wherein the method comprises the further step of:
preparing execution of the application assigned to the mobile device on at least one mobile edge system assigned to the at least one base station if the probability of the handover is bigger than a defined threshold value.

The probability of a handover may, for example, be determined by means of the temporal development of the signal characteristics of the first base station and one or more base station surrounding the first base station. One or more mobile edge system may be contacted to prepare the application handover and/or prepare execution of the application as described above. The mobile edge systems assigned to base stations surrounding the first base station may be grouped such that each of the mobile edge systems assigned to base stations surrounding the first base station or a subset of mobile edge systems is prepared to execute the application assigned to the mobile device. The members of the group may change depending on the temporal development of the signal characteristics.

The execution of the application assigned to the mobile device may, for example, be prepared for one or a group of mobile edge systems if the signal characteristics of the received radio signals of the assigned base stations fulfil operator defined UE and network policies (is e.g. above a defined threshold value). The threshold value may comprise a number of evaluation parameters. The threshold value may, for example, dynamically depend on the ratio of signal characteristics of the first base station in comparison to the second characteristics of base stations from which radio signals are received by the mobile device.

The step of determining the probability may comprise the further steps of determining a traveling route of the mobile device and determining at least one base station covering a part of the traveling route.

The temporal development of the signal characteristics may, for example, be used to determine a traveling route. Determination of the traveling route may be supported by means of navigation data provided by a navigation system. Base stations along the traveling route may be identified and mobile edge systems assigned to the identified base stations may be prepared to activate the application as described above. Transfer of application data and the activation of the application may be arranged to anticipate the movement of the mobile device as determined by means of the temporal development of the signal characteristics and/or navigation data. The signal characteristics may, for example, be determined in predetermined time intervals. The signal characteristics may alternatively or in addition be determined based on traveling data and, for example, mapping data showing the theoretical radio coverage of base stations along the traveling route.

According to a second aspect a first mobile edge system for mobile edge computing is provided. The first mobile edge system is assigned to a first base station of a mobile communication network. The mobile edge system is arranged to execute an application of a mobile device connected to the mobile communication network via the first base station. The first mobile edge system is arranged to establish a connection to a second mobile edge system depending on signal characteristics of radio signals received by the mobile device from base stations surrounding the first base station. The second mobile edge system is assigned to a second base station. The first mobile edge system is arranged to transfer application data related to the application of the mobile device for executing the application on the second mobile edge system.

According to a third aspect a network system for mobile edge computing is provided. The network system comprises a first mobile edge system assigned to a first base station of a mobile communication network and a second mobile edge system assigned to a second base station of the mobile communication network. The first mobile edge system is arranged to establish a connection to a second mobile edge system depending on signal characteristics of radio signals received by the mobile device from one, two or more base stations. The second mobile edge system is assigned to a second base station. The first mobile edge system is arranged to transfer application data related to the application of the mobile device for executing the application on the second mobile edge system. The second mobile edge system is arranged to activate execution of the application assigned to the mobile device upon reception of the application data. The network system is arranged to perform a handover from the first base station to the second base station such that the mobile device is connected with the mobile communication network via the second base station.

The first mobile edge system and the network system may be arranged to execute any embodiment of the method described above.

It shall be understood that a preferred embodiment of the invention can also be any combination of the dependent claims with the respective independent claim.

Further advantageous embodiments are defined below.

BRIEF DESCRIPTION OF THE DRAWINGS

These and other aspects of the invention will be apparent from and elucidated with reference to the embodiments described hereinafter.

The invention will now be described, by way of example, based on embodiments with reference to the accompanying drawings. In the drawings.

In the Figures, like numbers refer to like objects throughout. Objects in the Figures are not necessarily drawn to scale.

DETAILED DESCRIPTION OF EMBODIMENTS

Various embodiments of the invention will now be described by means of the Figures.

Figure 1:
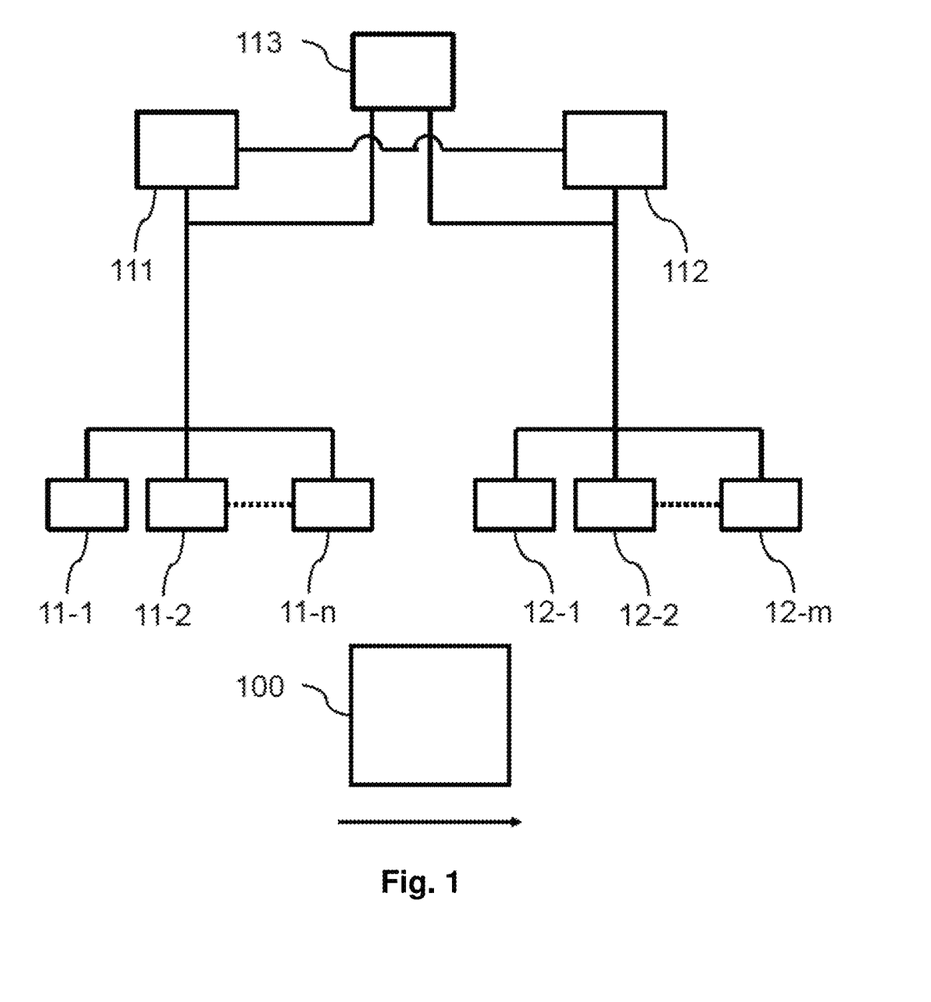
FIG. 1 shows a principal sketch of a network system

FIG. 1 shows a principal sketch of a network system comprised by a mobile communication system. FIG. 1 shows only the parts of the network system which are essential for the application handover. The network system may comprise further entities comprised, for example, by the core network of the mobile communication system. Further details are discussed with respect to FIG. 2 below.

The network system comprises n first base stations 11-1, 11-2 ... 11-n assigned to a first mobile edge system 111. The number n of first base stations 11-1, 11-2 ... 11-n may be one, two, three or more. The network system further comprises m second base stations 12-1, 12-2 ... 12-m assigned to a second mobile edge system 112. The number n of first base stations 11-1, 11-2 ... 11-n or second base stations 12-1, 12-2 ... 12-m may be one, two, three or more. Both the first base stations 11-1, 11-2 ... 11-n and the second base stations 12-1, 12-2 ... 12-m are in this embodiment also assigned to a third mobile edge system 113. There may be one, two, three or more mobile edge systems 111, 112, 113 assigned to, for example, one base station. The further explanations are simplified by only considering a single first base station 11-1 and a single second base station 12-1. The mobile edge systems 111, 112, 113 are arranged to execute applications assigned to a mobile device 100. The choice of a mobile edge system 111, 112, 113 executing a specific application assigned to the mobile device 100 may depend on the kind of application (e.g. specific applications are executed by the first mobile edge system 111 wherein other applications are executed by the third mobile edge system 113 both assigned to the first base station 11-1). Alternatively or in addition, the mobile edge system 111, 113 executing the application may be chosen, for example, based on available computing capacity or probability of a handover of the mobile device 100 from the first base station 11-1 to, for example, the second base station 12-1. It may, for example, be advantageous to execute an application assigned to the mobile device 100 by the third mobile edge system 113 if the probability of the handover to the second base station 12-1 is above a threshold value. The threshold value may be fixed or may depend on ratios of signal characteristics of the serving first base station 11-1 and the potential handover to the second base station 12-1. Considering the probability of a handover may have the advantage that unnecessary application handovers are avoided.

Figure 2:
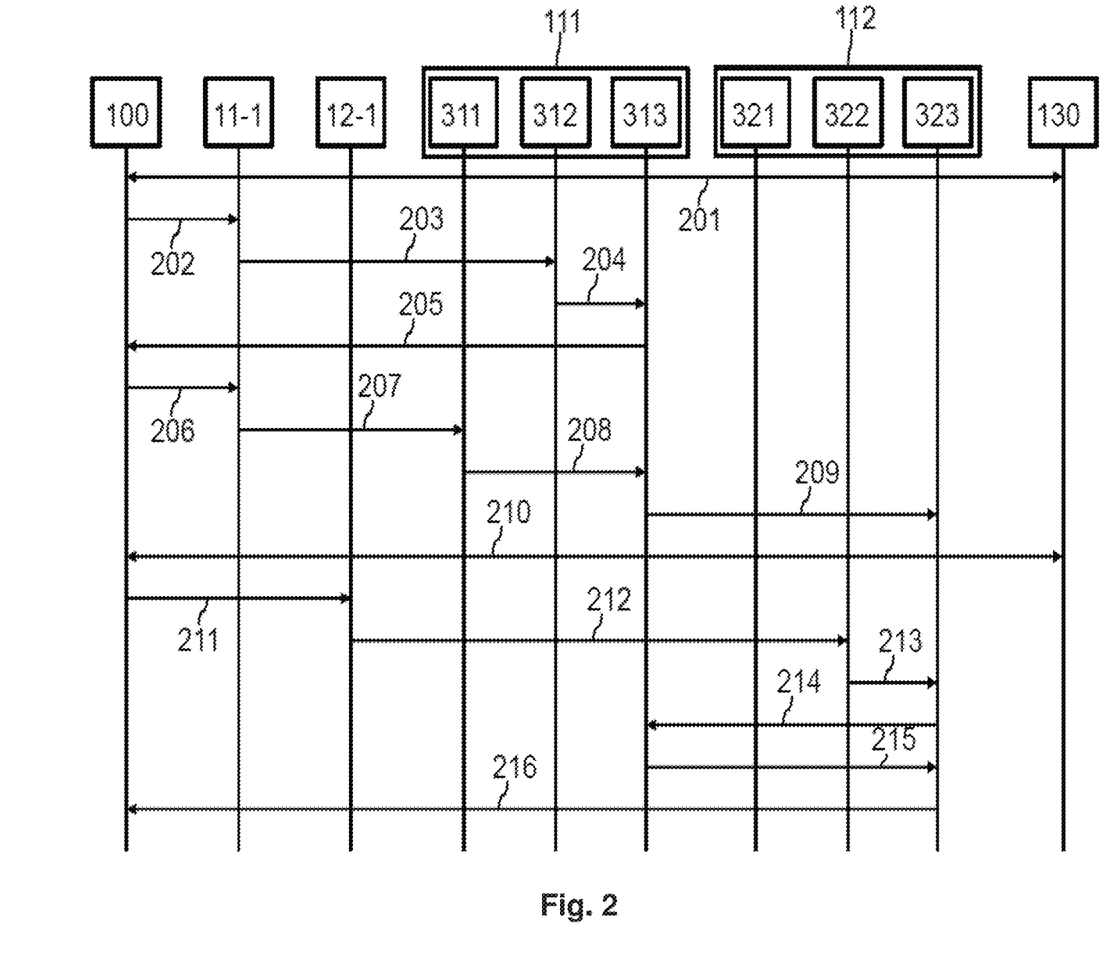
FIG. 2 shows a principal sketch of an application handover

FIG. 2 shows a principal sketch of an application handover which may be executed by means of, for example, a network system described in FIG. 1. The first mobile edge system 111 comprises a first Mobility Management Function 311 (MMF 1), a first Data Session Function 312 (DSF 1) and a first Mobile Edge Computer 313 (MEC 1). The second mobile edge system 112 comprises a second Mobility Management Function 321 (MMF 2), a second Data Session Function 322 (DSF 2) and a second Mobile Edge Computer 323 (MEC 2). The Mobility Management Function may, for example, be a mobility management entity (MME) according to the LTE standard (4G) or an Application management function (AMF) according to the 5G standard. The Data Session Function may, for example, be a serving gateway (S-GW) according to the LTE standard (4G) or a session management function (SMF) according to the 5G standard.

When the mobile device 100 moves out of the coverage area of the first base station 11-1 as indicated by the arrow in FIG. 1 and a handover takes place to the second base station 12-1, the application on the first Mobile Edge Computer 313 assigned to the mobile device 100 shall be moved from first Mobile Edge Computer 313 to the second Mobile Edge Computer 323 in order to keep the shortest distance between base station and assigned Mobile Edge Computer 313, 323 to guarantee low latency. The, for example, first and second base station 11-1, 12-1 hold in this embodiment a table that contains information about which base station is served by which Mobile Edge Computer in order to trigger the handover of the application from, for example, the first Mobile Edge Computer 313 to the second Mobile Edge Computer 323 if needed. The respective Mobility Management Function/Data Session Function/Mobile Edge Computer are considered to be in close proximity (e.g. one network entity comprising hardware components as processors, microprocessors and related data storage to execute the functions based on software code and data stored in the data storage). The selection of the respective Mobility Management Function is done by existing 3GPP concept of network slice identification.

The mobile device 100 is switched on, a default bearer is established in an initial attach 201. Within this procedure the slice_id is included by the mobile device 100 in order to identify that the connection shall be established to a specific application (here: in case of an application running on Mobile Edge Computer 1, Mobility Management Function 1 is chosen). The slice_id is already existing in 3GPP specifications. The mobile device 100 sends data including in this embodiment an application identifier and a mobile device identifier to the first base station 11-1 in step 202. The application identifier and mobile device identifier are forwarded to the first Data Session Function 311 (3GPP User Plane) of the first mobile edge system 111 in step 203. A new Application Programming Interface (API) is included in step 204 that enables the first Data Session Function 1 to transfer the application identifier and the mobile device identifier to the first Mobile Edge Computer 313. The first Mobile Edge Computer 313 transfers in step 205 a first Mobile Edge Computer Identifier (MEC-id1) to the mobile device 100 on the application layer to inform the mobile device 100 about the serving first Mobile Edge Computer 313.

The handover and the corresponding application handover is described in the following steps 206-216. Based on neighbour cell measurements performed by the mobile device 100 which contains the Physical Cell ID (PCI) of the neighbour cell served by, for example, the second base station 12-1 performed by the mobile device 100 and submitted to the first base station in step 206, the first base station 11-1 derives the Cell Global ID (CGI) as indicated in table 1 below. When a handover to second base station 12-1 is prepared the first base station 11-1 correlates in this embodiment the determined CGI with a second MEC_id2 of the second Mobile Edge Computer 323 assigned to the second base station 12-1 in the predefined/administrated table 1. Based on this information the first base station 11-1 requests the handover of the application and signals target second MEC_id2 and the mobile device identifier of the mobile device 100 to the first Mobility Management Function 311 in step 207 by submitting an application handover request to the first Mobility Management Function 311 (Signalling plane). Via a new API the first Mobility Management Function 311 transports the application handover request in step 208 as well as the second MEC_id2 and mobile device identifier to the serving first Mobile Edge Computer 313 which triggers activation of the application in the second Mobile Edge Computer 323 by means of an application activation message in step 209. The second Mobile Edge Computer 323 may optionally request application data essentially immediately after receiving the application activation message. Alternatively or in addition, the first Mobile Edge Computer 313 may transmit application data together with the application activation message or in an optional subsequent step. The 3GPP handover from the first base station 11-1 to the second base station 12-1 is performed in step 210 in a way well known to those skilled in the art. The mobile device 100 sends its data to the second base station 12-1 after performing the handover in step 211. The data is forwarded in step 212 to the second Session Data Function 322 with the old MEC-id1 of the first Mobile Edge Computer 313. A new API is included as discussed above with respect to step 204 that enables the second Data Session Function 322 to transfer the application identifier and the mobile device identifier to the second Mobile Edge Computer 323. The second Mobile Edge Computer 323 requests in step 214 from the first Mobile Edge Computer 313 to transfer all or only the remaining data of the transferred application assigned to the mobile device 100. The first Mobile Edge Computer 313 submits the remaining data or signals that there is no additional data in step 215. Finally, the Mobile Edge Computer ID of the second Mobile Edge Computer MEC_id2 is signaled to mobile device 100 in step 216 on application layer similar as already discussed with respect to step 205.

| MEC_id | PCI (Physical Cell ID) received in UE measurement | CGI (Cell Global ID) derived from PCI in UE Measurement |
| --- | --- | --- |
| 1 | 1 | 262020 . . . 001 |
| 2 | 2 | 262020 . . . 002 |
| . . . | . . . | . . . |

Table 1 above resides in the base stations 11-1, 12-1 for correlation of Cell ids to the MEC ids.

It is clear from the message flow discussed with respect to FIG. 2 that there may be several alternative approaches. It may, for example, not be necessary to transmit MEC-id1 to the second Data Session Function 322 as long as the second mobile edge system 112 can, for example, identify the first Mobile Edge Computer 313 based on the application identifier and/or the mobile device identifier which may be received by means of, for example, the application activation message 209. Furthermore, it may be possible that identification of the target second Mobile Edge Computer 323 is processed in the mobile device 100 based on the measurements inside the mobile device 100. The mobile device 100 may in this case send a request for application context relocation directly to the first Mobile Edge Computer 313 on application level taking the radio measurements into account instead of steps 207 and 208 described in FIG. 2 above. This method would however open a way to trigger the application handover without taking the Radio Network functionalities into account. I.e the mobile device 100 could request a handover without the knowledge of the processes in the first base station 11-1. There may in this case be the need for further signalling to synchronize the application handover with the handover from the first base station 11-1 to the second base station 12-1.

Figure 3:
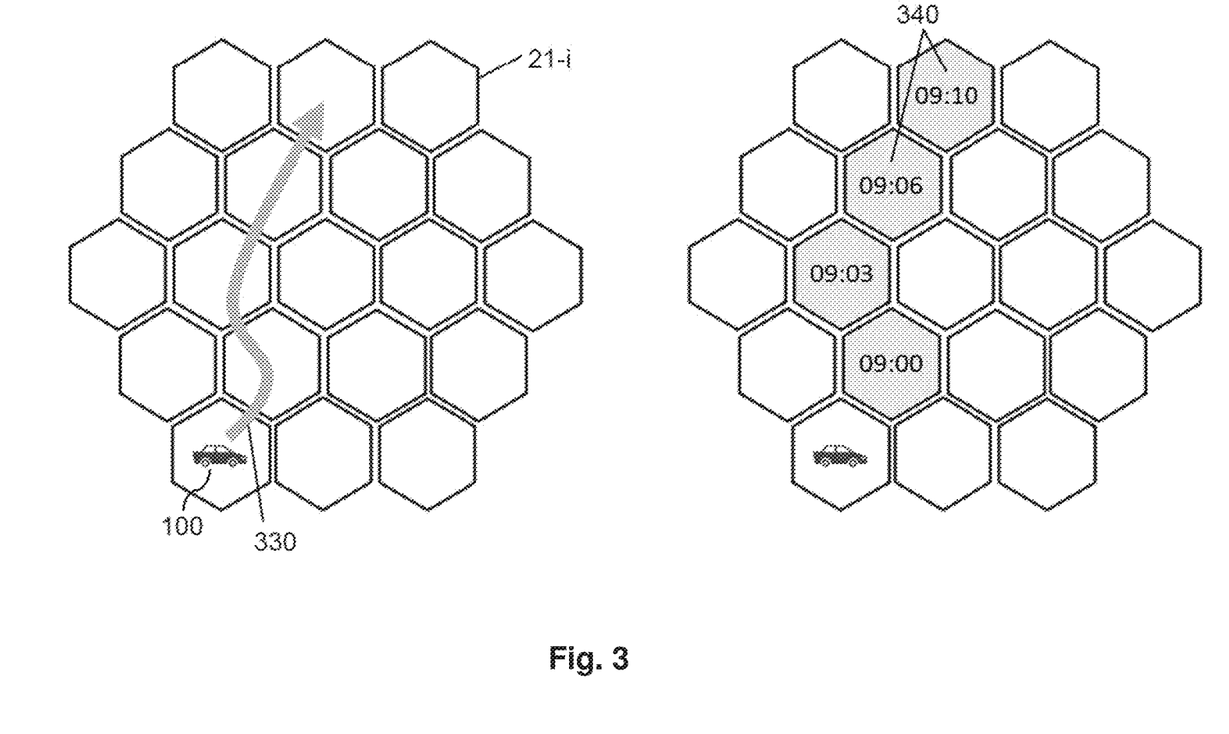
FIG. 3 shows a principal sketch of a first scenario of an application handover

FIG. 3 shows a principal sketch of a first scenario of an application handover. The mobile device 100 may be located in a vehicle. The mobile device 100 or the mobile communication network may, for example, be arranged to identify a traveling route 330 of the vehicle by means of the results of past radio measurements and navigation data. Base stations or radio cells 21-$i$ arranged along the traveling route and assigned mobile edge systems (not shown) may in this case be arranged to take over the application (e.g. exchange of real-time traffic data provided by other vehicles) according to a timing scheme indicated by the time 340 on the right side of FIG. 3. The timing scheme may be adapted depending on radio measurements performed by the mobile device 100.

Figure 4:
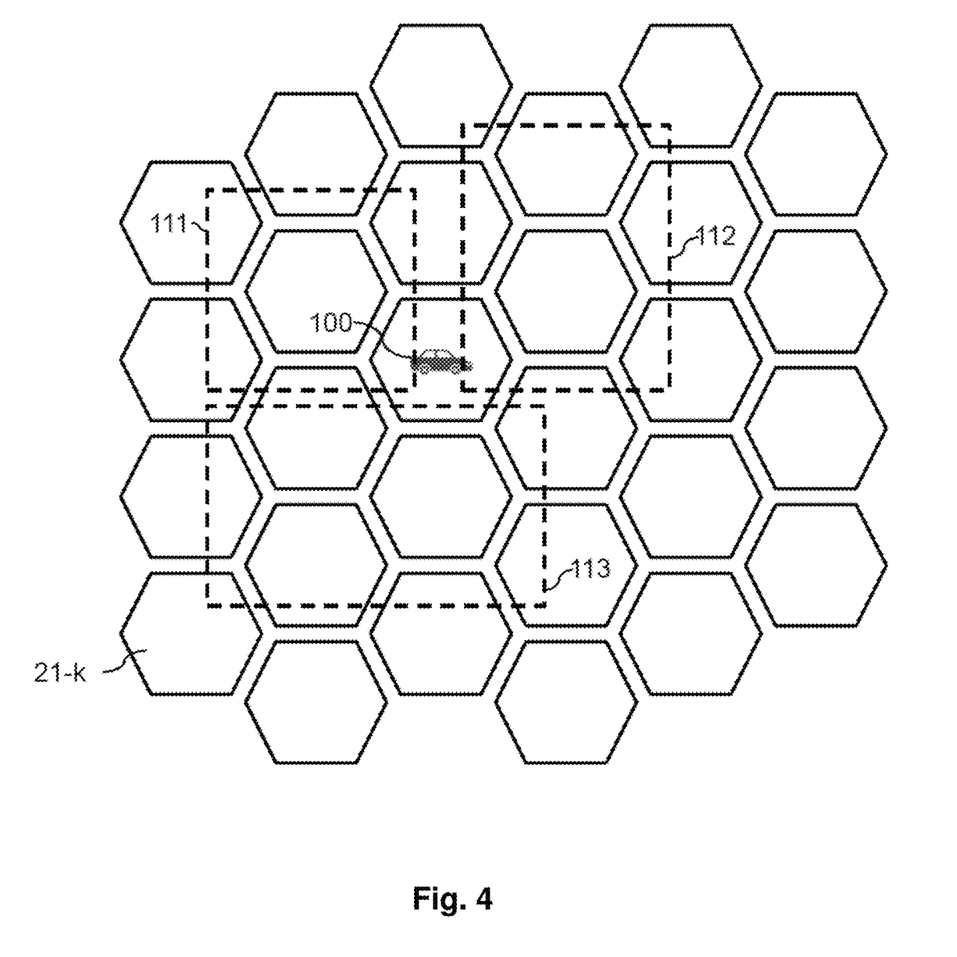
FIG. 4 shows a principal sketch of a second scenario of an application handover

FIG. 4 shows a principal sketch of a second scenario of an application handover. A first mobile edge system 111, a second mobile edge system 112, and a third mobile edge system 113 are each serving a number of base stations or mobile cells 21-$k$ surrounding mobile device 100. The first, second and third mobile edge system 111, 112 and 113 are grouped in this embodiment such that each application assigned to the mobile device 100 is executed in parallel on the respective Mobile Edge Computer of the first, second and third mobile edge system 111, 112 and 113. The grouping of the mobile edge systems 111, 112 and 113 may enable taking over the application in case of an unexpected change of the signal characteristic of the serving mobile cell 21-$k$. The grouping of the mobile edge systems may be adapted depending on radio measurements performed by the mobile device 100 when the mobile device travels, for example, through the coverage of the mobile cells 21-$k$ as discussed with respect to FIG. 3.

While the invention has been illustrated and described in detail in the drawings and the foregoing description, such illustration and description are to be considered illustrative or exemplary and not restrictive.

From reading the present disclosure, other modifications will be apparent to persons skilled in the art. Such modifications may involve other features which are already known in the art and which may be used instead of or in addition to features already described herein.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality of elements or steps. The mere fact that certain measures are recited in mutually different dependent claims does not indicate that a combination of these measures cannot be used to advantage.

Any reference signs in the claims should not be construed as limiting the scope thereof.

LIST OF REFERENCE NUMERALS 11-1, 11-2 . . . 11-$n$ first base stations
12-1, 12-2 . . . 12-$m$ second base stations
21-$i$, 21-$k$ mobile cells
100 mobile device
111 first mobile edge system
112 second mobile edge system
113 third mobile edge system
130 mobility management function (MMF)
201 initial attach
202 data to base station 1
203 data to a data session function 1
204 data to MEC application 1
205 MEC 1 ID to mobile device
206 mobile device measurements to base station 1
207 application handover request to MME 1
208 application handover request to MEC 1
209 application activation message to MEC 2
210 handover to base station 2
211 MEC 1 ID to base station 2
212 MEC 1 ID to DSF 2
213 MEC 1 ID to MEC application 2
214 data transfer request to MEC application 1
215 data transfer to MEC application 2
216 MEC 2 ID to mobile device
311 first Mobility Management Function (MMF 1)
312 first Data Session Function (DSF 1)
313 first Mobile Edge Computer (MEC 1)
321 second Mobility Management Function (MMF 2)
322 second Data Session Function (DSF 2)
323 second Mobile Edge Computer (MEC 2)
330 route
340 time

What is claimed is:

1. A method of performing an application handover for mobile edge computing applications a mobile communication network, the method comprising the steps of:
    evaluating signal characteristics of radio signals sent by base stations received by a mobile device, wherein the mobile device is connected to the mobile communication network via a first base station,
    exchanging data with a first mobile edge system assigned to the first base station, wherein the first mobile edge system executes an application assigned to the mobile device,
    establishing a connection between the first mobile edge system and a second mobile edge system depending on the evaluation of the signal characteristics of the radio signals wherein the second mobile edge system is assigned to a second base station,
    activating execution of the application assigned to the e device on the second mobile edge system, and
    performing a handover from the first base station second base station such that the mobile device is connected with the mobile communication network via the second base station,
    further wherein the step of activating execution of the application assigned to the mobile device on the second mobile edge system, comprises the further step of:
    exchanging application data of the application between the first mobile edge system and the second mobile edge system prior to performing the handover,
    further wherein the method comprises the additional steps of:
    determining, after performing the handover, whether additional application data has to be transferred in order to execute the application assigned to the mobile device by means of the second mobile edge system,
    exchanging the additional application data of the application between the first mobile edge system and the second mobile edge system.

2. A method of performing an application handover for mobile edge computing applications in a mobile communication network, the method comprising the steps of:
    evaluating signal characteristics of radio signals sent by base stations received by a mobile device, wherein the mobile device is connected to the mobile communication network via a first base station,
    exchanging data with a first mobile edge system assigned to the first base station, wherein the first mobile edge system executes an application assigned to the mobile device,
    establishing a connection between the first mobile edge system and a second mobile edge system depending on the evaluation of the signal characteristics of the radio signals, wherein the second mobile edge system is assigned to a second base station,
    activating execution of the application assigned to the mobile device on the second mobile edge system, and
    performing a handover from the first base station to the second base station such that the mobile device is connected with the mobile communication network via the second base station,
    further wherein the method comprises the additional steps of:
    transferring an identifier of the first mobile edge system from the mobile device to the second mobile edge system via the second base station,
    exchanging application data of the application between the first mobile edge system and the second mobile edge system after performing the handover upon reception of the identifier of the first mobile edge system.

3. A method of performing an application handover for mobile edge computing applications in a mobile communication network, the method comprising the steps of:
- evaluating signal characteristics of radio signals sent by base stations received by a mobile device, wherein the nubile device is connected to the mobile communication network via a first base station,
- exchanging data with a first mobile edge system assigned to the first base station, wherein the first mobile edge system executes an application assigned to the mobile device,
- establishing a connection between the first mobile edge system and a second mobile edge system depending on the evaluation of the signal characteristics of the radio signals, wherein the second mobile edge system is assigned to a second base station,
- activating execution of the application assigned to the mobile device on the second mobile edge system, and
- performing a handover from the first base station to the second base station such that the mobile device is connected with the mobile communication network via the second base station, further wherein the step of evaluating the signal characteristics of the radio signals received by the mobile device comprises the step of:
- determining a probability of a handover to at least one base station, wherein the method comprises the further step of:
- preparing execution of the application assigned to the mobile device on at least one mobile edge system assigned to the at least one base station if the probability of the handover is bigger than a defined threshold value.

4. A method of performing an application handover for mobile edge computing applications in a mobile communication network, the method comprising the steps of:
- evaluating signal characteristics of radio signals sent by base stations received by a mobile device, wherein the mobile device is connected to the mobile communication network via a first base station,
- exchanging data with a first mobile edge system assigned to the first base station, wherein the first mobile edge system executes an application assigned to the mobile device,
- establishing a connection between the first mobile edge system and a second mobile edge system depending the evaluation of the signal characteristics of the radio signals, wherein the second mobile edge system is assigned to a second base station,
- activating execution of the application assigned to the mobile device on the second mobile edge system, and
- performing a handover from the first base station to the second base station such that the mobile device is connected with the mobile communication network via the second base station, further wherein the step of evaluating the signal characteristics of the radio signals received by the mobile device comprises the step of:
- determining a probability of a handover to at least one base station, wherein the method comprises the further step of:
- preparing execution of the application assigned to the mobile device on at least one mobile edge system assigned to the at least one base station if the probability of the handover is bigger than a defined threshold value, further wherein execution of the application assigned to the mobile device is prepared if the signal characteristics of the received radio signals is above a defined threshold value.

5. A method of performing an application handover for mobile edge computing applications in a mobile communication network, the method comprising the steps of:
- evaluating signal characterisitics of radio signals sent by base stations received by a mobile device, wherein the mobile device is connected to the mobile communication network via a first base station,
- exchanging data with a first mobile edge system assigned to the first base station, wherein the first mobile edge system executes an application assigned to the mobile device,
- establishing a connection between the first mobile edge system and a second mobile edge system depending on the evaluation of the signal characteristics of the radio signals, wherein the second mobile edge system is assigned to a second base station,
- activating execution of the application assigned to the mobile device on the second mobile edge system, and
- performing a handover from the first base station to the second base station such that the mobile device is connected with the mobile communication network via the second base station, wherein the method comprises the further optional step of:
- further wherein the step of evaluating the signal characteristics of the radio signals received by the mobile device comprises the step of:
- determining a probability of a handover to at least one base station, wherein the method comprises the further step of:
- preparing execution of the application assigned to the mobile device on at east one mobile edge system assigned to the at least one base station if the probability of the handover is bigger than a defined threshold value,
- further wherein the step of determining the probability comprises the further step of:
- determining a traveling route of the mobile device,
- determining at least one base station covering a part of the traveling route.

* * * * *